B. I. RYDBERG.
BALL BEARING OR ROLLER BEARING.
APPLICATION FILED JAN. 16, 1917.
1,273,187.   Patented July 23, 1918.
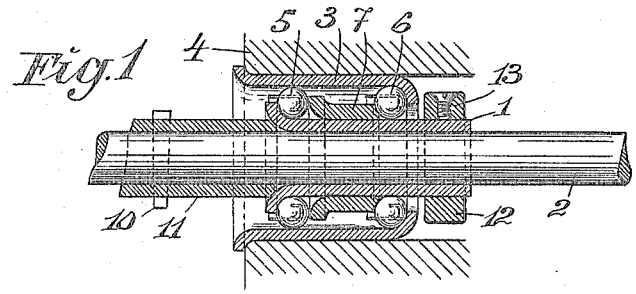
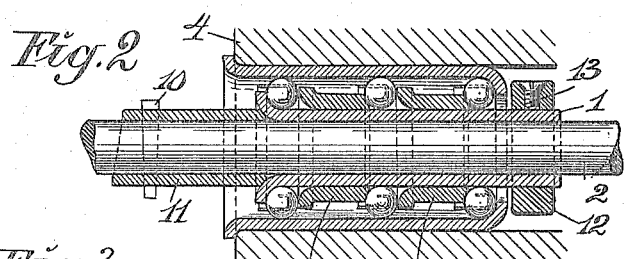
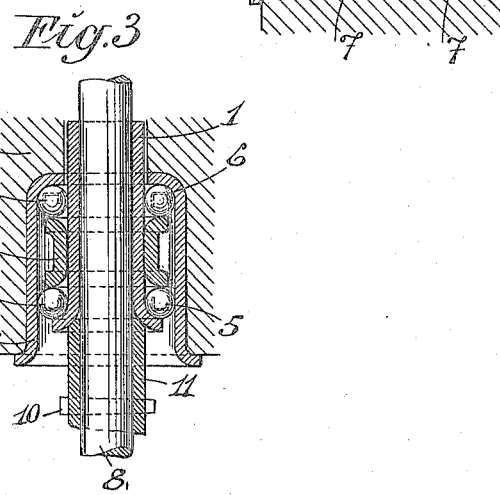
INVENTOR:
B. I. RYDBERG
ATTORNEY.

UNITED STATES PATENT OFFICE.

BIRGER ISIDOR RYDBERG, OF LINDESBERG, SWEDEN.

BALL-BEARING OR ROLLER-BEARING.

1,273,187.  Specification of Letters Patent.  Patented July 23, 1918.

Application filed January 16, 1917. Serial No. 142,731.

*To all whom it may concern:*

Be it known that I, BIRGER ISIDOR RYDBERG, a subject of the King of Sweden, and resident of Lindesberg, in the Kingdom of Sweden, have invented certain new and useful Improvements in Ball-Bearings or Roller-Bearings, of which the following is a specification, reference being had therein to the accompanying drawing.

This invention relates to a ball-bearing with two or more rows of balls, in which the inner and outer bushes consist of tube pieces, which at their one end are curved outward and inward respectively and so combined with one another, that their curved parts form races to the outermost rows of balls. Distance pieces are slid on the inner bush, which sustain the axial thrust. The said distance pieces consist of tubes which at their one end or at both ends are curve-shaped in the same manner as the said inner- and outer bushes. Rollers may be substituted for the balls, the ends of which bear against the ends of the bushes and the curved parts of the distance pieces.

In the accompanying drawing Figures 1 and 2 are longitudinal sections of two ball-bearings arranged in accordance with this invention and adapted for horizontal shafts, said bearings being provided with two and three rows of balls respectively. Fig. 3 shows in a vertical section a ball-bearing arranged in accordance with this invention and provided with two rows of balls, the said bearing being adapted to a vertical shaft.

In the ball-bearing shown in Fig. 1, which is adapted to sustain radial thrust and an axial thrust in one direction, the inner bush 1, which is slid on the shaft 2, is made from a tube piece, the one end of which is curved outward for instance by means of a stamp and a matrix or by spinning in a lathe. The outer bush 3 is made from a tube piece and its ends are curved inward and outward respectively by treating the tube piece by means of a stamp and a matrix or in a lathe. The outwardly curved edge of the bush 3 bears against the body 4 of the bearing. The bushes 1 and 3 are so long, that two or more rows of balls together with intermediate distance pieces may be located on the same. Thus, in Fig. 1 two rows of balls 5 and 6 together with intermediate distance pieces 7 are shown. The outwardly curved end of the inner bush 1 forms a support to the balls of one row axially, while the inner, inwardly curved end of the outer bush 3 forms also axially a support to the other rows of balls. Owing to the said arrangement the bearing is able to sustain axial thrust in one direction and may be used for instance on the shaft of a carriage, which is provided at its ends with bearings of the type in question and acting in opposite directions.

The bearing shown in Fig. 2 is arranged in the same manner as the bearing shown in Fig. 1 but the bushes are so long, that there is room for three rows of balls together with the necessary distance pieces. The bushes may evidently be arranged for a still greater number of ball rows with distance pieces.

In the ball-bearing, which is shown in Fig. 3 and provided with two rows of balls and may carry for instance a body 9 rotating on a stationary shaft 8, the bushes 1 and 3 are arranged and manufactured in the same manner as those shown in Figs. 1 and 2. The body 9 bears against the outer bush 3 at both its ends but may bear only against the inner end of the same, in which case the outer end of the bush must not be curved outward. In Fig. 3 both ends of the distance pieces, 7, are bent outward.

The distance pieces mentioned above and located between the ball rows may be made from tube pieces in the same manner as the bushes. The inner bush 1 of the bearings described above may be loosely slid on the shaft and held in position by a sleeve 11 slid on the shaft and fixed by means of a pin 10 or in any other manner. For the connecting of the parts of the bearing so that the parts as a whole can be mounted on the shaft or into the body or frame of the bearing, a ring 12 may be provided on the inner bush and fixed by means of a screw 13.

Instead of balls, rollers may be used, as easily understood by those skilled in the art. The bushes as well as the distance pieces of all bearings described above may be stamped from blanks of sheet metal or by spinning in a lathe.

Bearings arranged in accordance with this invention have a great supporting capacity. By suitably adapting the number of the ball rows or the length of the rollers the bearings may be adapted for different purposes.

Having now described my invention, what I claim as new and desire to secure by Letters Patent is:

1. In a bearing, the combination of a plurality of rows of solids of revolution, an inner bush having its one end curved outward, an outer bush having its one end curved inward, the said curved parts of the bushes forming races for the outermost rows of the said solids respectively, and a distance piece located between each pair of rows of solids of revolution and transmitting axial thrust, said distance pieces consisting of tube pieces each having one of its ends curved outward, substantially as described and shown in the accompanying drawing.

2. In a bearing, the combination of a plurality of rows of balls, an inner bush having its one end curved outward, an outer bush having its one end curved inward, the said curved parts of the bushes forming races for the outermost rows of the said balls respectively, and a distance piece located between each pair of rows of balls and transmitting axial thrust, said distance pieces consisting of tube pieces having their ends curved outward, substantially as described.

In witness whereof, I have hereunto signed my name.

BIRGER ISIDOR RYDBERG.

Copies of this patent may be obtained for five cents each, by addressing the "Commissioner of Patents, Washington, D. C."